US012355193B2

(12) United States Patent
Ni

(10) Patent No.: US 12,355,193 B2
(45) Date of Patent: Jul. 8, 2025

(54) SAFETY SOCKET WITH A MOVABLE CONTACT PIECE AND A PRESSING ROD

(71) Applicant: HUBEI XIEKANG Electronic Technology Co., Ltd., Huangshi (CN)

(72) Inventor: Xinhua Ni, Huangshi (CN)

(73) Assignee: HUBEI XIEKANG Electronic Technology Co., Ltd., Huangshi (CN)

( * ) Notice: Subject to any disclaimer, the term of this patent is extended or adjusted under 35 U.S.C. 154(b) by 485 days.

(21) Appl. No.: 17/868,725

(22) Filed: Jul. 19, 2022

(65) Prior Publication Data

US 2023/0352887 A1 Nov. 2, 2023

(30) Foreign Application Priority Data

May 1, 2022 (CN) ......................... 202221030460.5

(51) Int. Cl.
*H01R 13/11* (2006.01)
*H01R 13/703* (2006.01)

(52) U.S. Cl.
CPC ......... *H01R 13/7036* (2013.01); *H01R 13/11* (2013.01)

(58) Field of Classification Search
CPC ............................ H01R 13/7036; H01R 13/11
USPC .................................................. 439/188, 106
See application file for complete search history.

(56) References Cited

U.S. PATENT DOCUMENTS

| | | | | |
|---|---|---|---|---|
| 6,193,539 B1 * | 2/2001 | Chang | H01R 13/6278 439/346 |
| 2002/0142671 A1 * | 10/2002 | Yano | H01R 4/4846 439/721 |
| 2013/0295789 A1 * | 11/2013 | Chuang | H01R 13/713 439/188 |
| 2013/0337675 A1 * | 12/2013 | Cai | H01R 13/20 439/345 |

* cited by examiner

*Primary Examiner* — Tulsidas C Patel
*Assistant Examiner* — Thaslimur Rahman
(74) *Attorney, Agent, or Firm* — Bochner PLLC; Andrew Bochner; Eric Kleinertz

(57) ABSTRACT

The present disclosure provides a safety socket, in which: the electrical connecting component includes a fixed terminal, a plughole component including three static contact pieces and a movable contact piece enclosing a plughole, an elastic component forcing the movable contact piece to deviate to the inner side of the plughole, and a connecting terminal for dynamically electrically connecting the plughole component and the fixed terminal; the bottom of the plughole component is provided with a liftable pressing rod, and when the pressing rod is pressed down, the connecting terminal and the fixed terminal can be forced to contact and conduct through a lever component.

9 Claims, 3 Drawing Sheets

SAFETY SOCKET WITH A MOVABLE CONTACT PIECE AND A PRESSING ROD

TECHNICAL FIELD

The present disclosure relates to the technical field of sockets, and more particularly, to a safety socket.

BACKGROUND ART

In daily life, a large number of sockets are usually set up to facilitate power-on, but children, due to their strong curiosity, are prone to insert foreign objects into the socket holes if they are neglected, thereby causing risks of electric shock.

In order to solve this problem, various safety sockets have appeared on the market, among which, the most basic structure is to set a contact piece of the plughole into a movable contact piece of an elastic structure, the socket can be energized only after pressing the movable contact piece to make it move and be conductive, so as to prevent children from inserting foreign objects into the socket and causing electric shock.

However, there is still a certain risk of electric shock for a safety switch of this type of structure, for example, the width of the foreign object is exactly the same as the standard size of the plughole, or the foreign object is just inserted with force towards the side of the contact piece, which may cause the contact piece to be conductive, thereby causing electric shock.

SUMMARY OF THE INVENTION

In view of the deficiencies in the prior art, the purpose of the present application is to provide a safety socket with higher safety, which can effectively reduce the risk of electric shock caused by the insertion of foreign objects into the plughole.

To achieve the above object, the technical scheme adopted by the present disclosure is:

A safety socket, which includes a housing, and at least one set of socket components mounted in the housing; the socket component includes two sets of symmetrically arranged and mutually independent electrical connecting components, the electrical connecting component includes a fixed terminal for electrical connection with an external live wire or a neutral wire, a plughole component, an elastic component that forces the movable contact piece to shift to an inner side of the plughole, and a connecting terminal for dynamically electrically connecting the plughole component and the fixed terminal; wherein the plughole of the plughole component is enclosed by three static contact pieces and one movable contact piece, the connecting terminal includes a static end and a movable end, the movable contact piece includes an insulating portion corresponding to the inner side of the plughole, and a conductive portion located on an outer side, and the conductive portion is electrically connected with at least one of the static contact pieces, when the movable contact piece is reset outward to a standard width position of the plughole, the conductive portion can be in contact and conducted with the static end of the connecting terminal; an insulating pressing rod is movably disposed upwardly on a bottom of the plughole component, a lower portion of the pressing rod is provided with a spring that can elastically lift it up and down, and the lower portion of the pressing rod is connected and fixed with a first end of a lever component, when a top end of the pressing rod is lowered to a standard depth position of the plughole, the movable end of the connecting terminal can be forced to contact and conduct with the fixed terminal through a second end of the lever component.

According to a preferred structure, the plughole component includes a metal base plate, the three static contact pieces are arranged on three sides of the base plate, and the movable contact piece is pivotally connected and electrically conducted with base plate through the conductive portion and is electrically connected.

According to a preferred solution, only the static contact piece located opposite to the movable contact piece is a conductive contact piece, and the movable contact piece and the opposite static contact piece are located at both ends of the plughole in a length direction.

According to a preferred solution, the elastic component includes a rotating shaft vertically arranged and rotatably mounted in the housing, a connecting plate connecting the rotating shaft and the movable contact piece, and a torsion spring sleeved on the rotating shaft and used to provide elastic force for the movable contact piece.

According to a preferred solution, a bottom end of the pressing rod passes downwardly through the first end of the lever component, the spring is sleeved on the pressing rod, and both ends of the spring abut between a bottom surface of the lever component and an inner bottom surface of the housing.

According to a preferred solution, the lever component includes a rotating shaft arranged laterally and rotatably mounted on the housing as a fulcrum, and a lever whose middle portion is fixed to the rotating shaft and rotates with the rotating shaft. Further, the lever is made of insulating material.

According to a preferred solution, the connecting terminal includes a vertical portion and a horizontal portion that are integrally punched and formed, and one end of the vertical portion correspondingly disposed on an outer side of the conductive portion forms the static end, one end of the horizontal portion correspondingly disposed below the fixed terminal forms the movable end, and the movable end is fixed with the second end of the lever component.

According to a preferred solution, protruding contacts for contact and conduction are provided between the conductive portion and the static end, and between the movable end and the fixed terminal.

The beneficial effects of the present application are: when a foreign object is inserted into any plughole of the socket, at the same time, it is necessary to push the movable contact piece outward to the standard plughole width position, and the pressing rod is pressed down to the standard plughole depth, only then the plughole components corresponding to the live wire can be electrically connected, but the probability of meeting the above two conditions at the same time is very low, thereby greatly reducing the risk of electric shock to children; in addition, since the inner side of the movable contact piece is an insulating portion, in the case that the foreign object does not meet the standard plug size, even if the conditions for making the movable contact piece conductive and pressing the pressing rod in place are met at the same time, such as an oblique insertion of a slender foreign object, at this time, if the foreign object only contacts the insulating portion and the pressing rod, it will not cause electric shock, thereby further improving the safety of the socket.

BRIEF DESCRIPTION OF THE DRAWINGS

The present disclosure will be described in further detail below with reference to the drawings and specific embodiments.

DETAILED DESCRIPTION

The present disclosure will be further described below with reference to the drawings:

In this embodiment, a single-plug safety socket is used as an example for description, certainly, the structure of the safety socket is also suitable for a row plug structure, and is applicable regardless of whether it is a two-hole socket or a three-hole socket.

Figure 1:
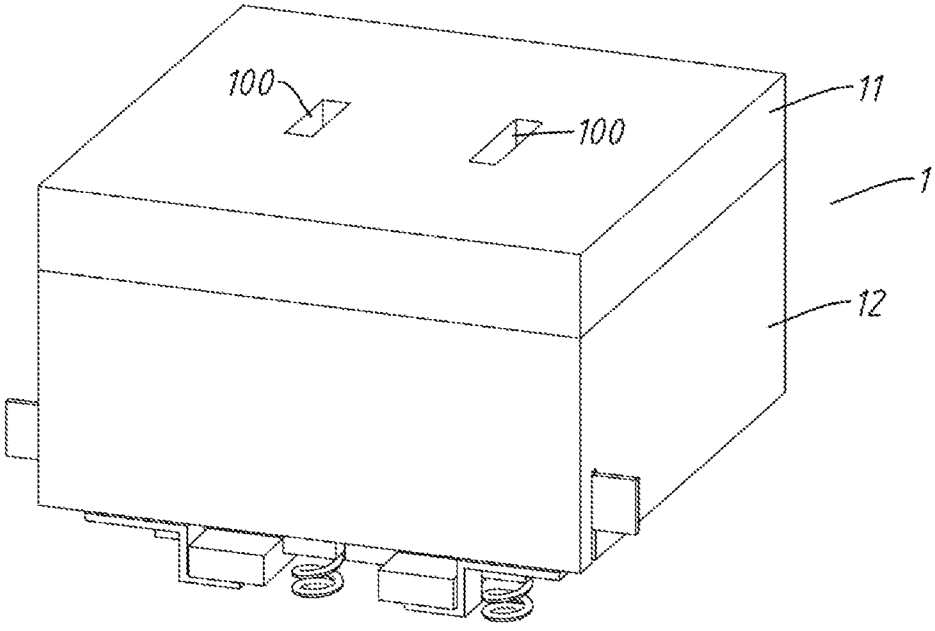
FIG. 1 is a perspective view of the overall structure of the safety socket according to an embodiment.
Figure 2:
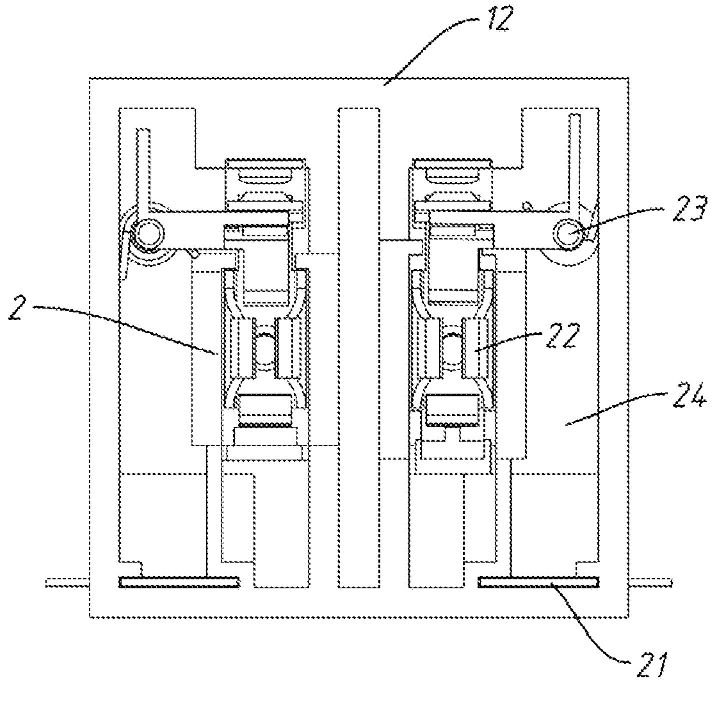
FIG. 2 is a top view of the internal structure of the safety socket after removing the top surface of the housing according to an embodiment.
Figure 3:
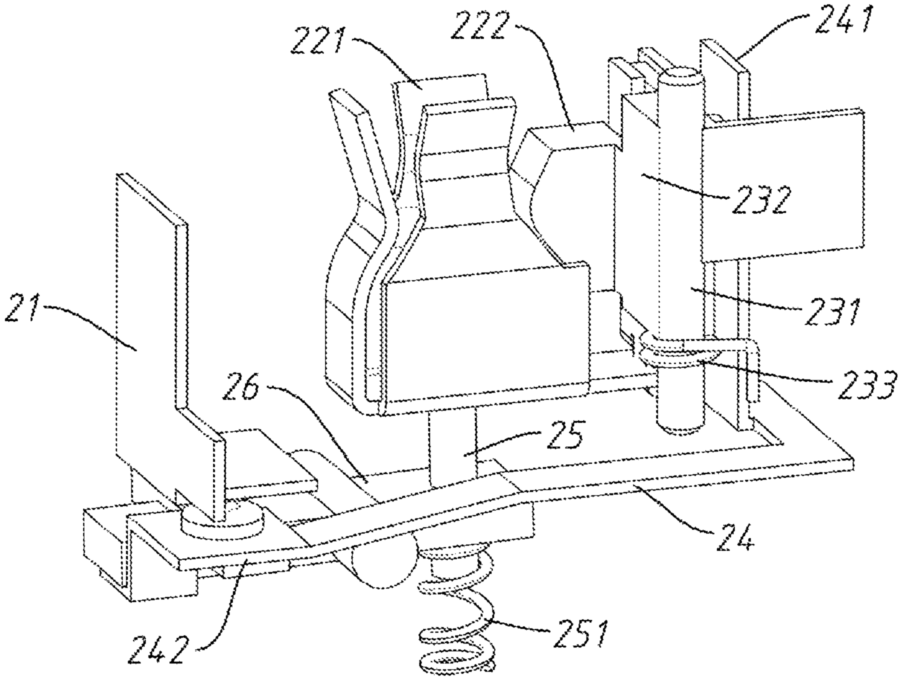
FIG. 3 is the first perspective view of the electrical connecting component according to an embodiment.
Figure 4:
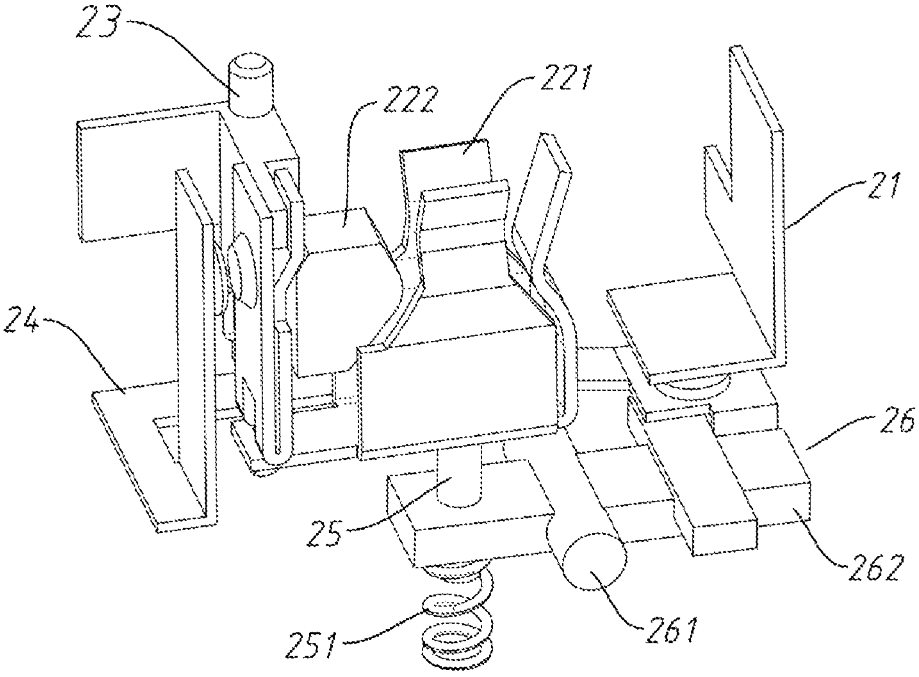
FIG. 4 is the second perspective view of the electrical connecting component according to an embodiment.
Figure 5:
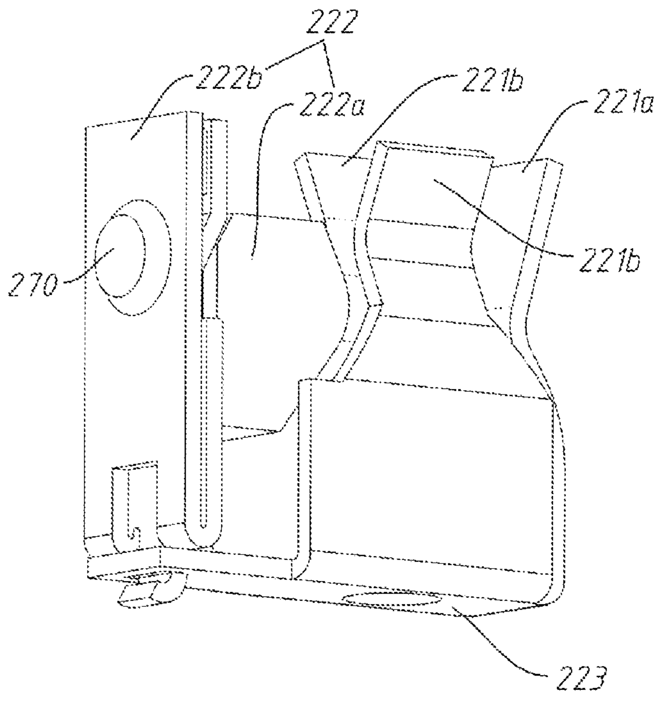
FIG. 5 is a structural perspective view of the plughole component according to an embodiment.
Figure 6:
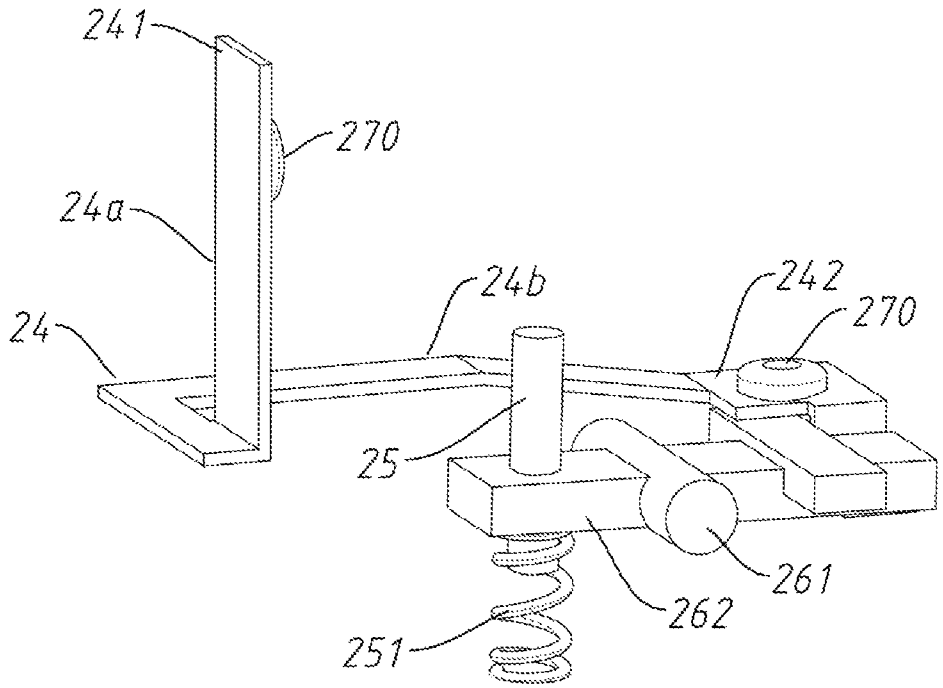
FIG. 6 is a perspective view of the installation structure of the connecting terminal, the lever component and the pressing rod according to an embodiment.

Referring to FIG. 1 and FIG. 2, the safety socket is usually used for snap-fit installation in a wall pre-mounted socket bottom box, at this time, the bottom surface of the housing 1 can be replaced by a socket bottom box pre-mounted in the wall. The safety socket includes the housing 1 and a set of double-hole socket components mounted in the housing 1. The housing 1 includes a detachable top surface 11 and four side surfaces 12 of an integrated structure, the top surface 11 of the housing 1 is provided with two inlets corresponding to the plugholes 100 that are inserted into the plugs, the structure of the inner side of the housing 1 for installing the socket component is correspondingly designed according to the specific structure of the socket component, and is usually integrally formed with the side surface 12 of the housing 1.

Referring to FIGS. 2 to 6, the socket component includes two sets of symmetrically arranged and mutually independent electrical connecting components 2, the electrical connecting component 2 includes a fixed terminal 21 for electrical connection with an external live wire or a neutral wire, the plughole component 22 including three static contact pieces 221 and one movable contact piece 222 is enclosed from four sides to form the plughole 100, the elastic component 23 for forcing the movable contact piece 222 to deflect toward the inner side of the plughole 100, and the connecting terminal 24 for dynamically and electrically connecting the plughole component 22 and the fixed terminal 21. The connecting terminal 24 includes a static end 241 and a movable end 242, the movable contact piece 222 includes an insulating portion 222*a* corresponding to the inner side of the plughole 100, and a conductive portion 222*b* located on the outer side. The conductive portion 222*b* is electrically connected to at least one of the static contact pieces 221, when the plug is inserted, the movable contact piece 222 is reset outward to the standard width position of the plughole 100, and the conductive portion 222*b* can be in contact and conducted with the static end 241 of the connecting terminal 24; the bottom of the plughole component 22 is also movably provided with an insulating pressing rod 25 upwards, the lower portion of the pressing rod 25 is provided with a spring 251 which can elastically lift it up and down, and the lower portion of the pressing rod 25 is also connected and fixed with the first end of a lever component 26, specifically, the bottom end of the pressing rod 25 passes downwardly through the first end of the lever component 26, the spring 251 is sleeved on the pressing rod 25 and both ends abut between the bottom surface of the lever component 26 and the inner bottom surface of the housing 1. The lever component 26 includes a rotating shaft 261 arranged laterally and rotatably mounted on the housing 1 as a fulcrum, and a lever 262 whose middle portion is fixed to the rotating shaft 261 and rotates with it, when the top of the pressing rod 25 is lowered to the standard depth position of the plughole 100, that is, the depth when the standard plug is inserted in place, the pressing rod 25 can force the movable end 242 of the connecting terminal 24 to contact the fixed terminal 21 through the second end of the lever component 26; the lever 262 is made of insulating material, which can prevent the fixed terminal 21 from being electrically connected to the plughole component 22 through the lever component 26.

When the standard plug is inserted into the plughole 100, the standard-sized plug will push the movable contact piece 222 to move outward and make contact and conduct with the static end 241, and the bottom end of the plug will press down the pressing rod 25, when the plug is inserted downwards in place, the pressing rod 25 forces the movable end 242 to just contact the fixed terminal 21 through the lever component 26, and then the plughole component 22 can be energized. When foreign objects that do not meet the standard plug width and depth are inserted into any plughole 100 of the socket, and when the movable contact piece 222 is pushed outward to the width of the standard plughole 100, and at the same time the pressing rod 25 is pressed down to the depth of the standard plughole 100, only then can the plughole component 22 corresponding to the live wire be electrically connected, however, the probability of meeting the above two conditions at the same time is very low, so the risk of electric shock to children can be greatly reduced; in addition, since the inner side of the movable contact piece 222 is the insulating portion 222*a*, in the case that the foreign object does not conform to the standard plug size, even if the conditions of making the movable contact piece 222 conductive and pressing the pressing rod 25 in place are met at the same time, such as an oblique insertion of the slender foreign object, at this time, if the foreign object only contacts the insulating portion 222*a* and the pressing rod 25, it will not cause an electric shock, thereby further improving the safety of the socket.

According to a preferred structure, the plughole component 22 includes a metal base plate 223, the three static contact pieces 221 are disposed on three sides of the base plate 223, and the movable contact piece 222 is pivotally connected to the base plate 223 through the conductive portion 222*b* and is electrically connected. The base plate 223 has the function of installing and conducting the static contact piece 221 and the movable contact piece 222, the movable contact piece 222 is pivotally connected and electrically conducted with the base plate 223, which can not only ensure the electrical connection between the two, but also make the upper end of the movable contact piece 222 swing back and forth toward the inner side and outside.

According to a preferred structure, only the static contact piece 221*a* located opposite to the movable contact piece 222 is a conductive contact piece, the movable contact piece 222 and the opposite static contact piece 221*a* are respectively located at both ends of the plughole 100 in the length direction, and are both electrically connected to the base plate 223. At this time, the two static contact pieces 221*b* located on both sides in the width direction of the plughole 100 are insulating contact pieces, under these circumstances, the inserted foreign object not only needs to push the movable contact piece 222 and the pressing rod 25 to the width and depth of the standard plughole 100 at the same time, in addition, it is necessary to contact the conductive static contact piece 221*a* on the opposite side to achieve electrical conduction, the probability that the above conditions can be met at the same time is further reduced, thus the safety of the socket is further improved.

According to a preferred structure, the elastic component 23 includes a rotating shaft 231 vertically arranged and rotatably mounted in the housing 1, a connecting plate 232 connecting the rotating shaft 231 and the movable contact piece 222, and a torsion spring 233 sleeved on the rotating shaft 231 to provide elastic force for the movable contact piece 222. Two ends of the torsion spring 233 abut against the connecting plate 232 and the inner wall of the housing 1 respectively, so as to provide the movable contact piece 222 with an inward elastic force. Certainly, the elastic component 23 is not limited to the present structure, and can also be any existing structure that can provide the movable contact piece 222 with an elastic force to deflect the inner side of the plughole 100, the simplest structure is that the movable contact piece 222 itself has strong resilience, and is deformed to the inner side of the plughole 100 by its own resilience under normal conditions. Alternatively, the elastic component 23 includes a compression spring pressing against the outer side of the movable contact piece 222, or includes a tension spring connected to the inner side of the movable contact piece 222, or the like.

According to a preferred structure, the connecting terminal 24 includes a vertical portion 24*a* and a horizontal portion 24*b* that are integrally punched and formed, and one end of the vertical portion 24*a* correspondingly disposed on an outer side of the conductive portion 222*b* forms the static end 241, one end of the horizontal portion 24*b* correspondingly disposed below the fixed terminal 21 forms the movable end 242, and the movable end 242 is fixed with the second end of the lever component 26. Both ends of the connecting terminal 24 are in different positions and have different installation directions, only when both ends are conductive at the same time can the plughole component 22 be electrically connected, thereby avoiding misconnection when subjected to an impact force in the same direction, and having higher safety.

According to preferred structure, protruding contacts 270 for contact and conduction are provided between the conductive portion 222*b* and the static end 241 and between the movable end 242 and the fixed terminal 21. Since each terminal is likely to generate more heat at the moment of contact and electrification, the protruding contacts 270 are not easily deformed due to heat generation, and the reliability of the electrical connection can still be ensured after long-term use.

The above is not intended to limit the technical scope of the present disclosure, and any modifications, equivalent changes and modifications made to the above embodiments according to the technical essence of the present disclosure still fall within the scope of the technical solutions of the present disclosure.

What is claimed is:

1. A safety socket, comprising:

a housing, and at least one set of socket components mounted in the housing, wherein each of the socket components includes two sets of electrical connecting components arranged to be symmetrical and mutually independent, each of the electrical connecting components including:

a first fixed terminal for electrical connection with an external live wire and a second fixed terminal for electrical connection with a neutral wire, a plughole component with a plughole enclosed by three static contact pieces and one movable contact piece, an elastic component for forcing the movable contact piece to shift to an inner side of the plughole, and a connecting terminal for dynamically electrically connecting the plughole component and the first fixed terminal and the second fixed terminal;

wherein the connecting terminal includes a static end and a movable end, the movable contact piece comprises an insulating portion corresponding to the inner side of the plughole, and a conductive portion located on an outer side of the plughole, and wherein the conductive portion is electrically connected with at least one of the static contact pieces, and when the movable contact piece is reset outward to a standard width position of the plughole, the conductive portion is in contact and conducted with the static end of the connecting terminal; and wherein an insulating pressing rod is movably disposed upwardly on a bottom of the plughole component, a lower portion of the pressing rod is provided with a spring that elastically lifts the pressing rod up and down, and the lower portion of the pressing rod is connected and fixed with a first end of a lever component, and wherein when a top end of the pressing rod is lowered to a standard depth position of the plughole, the movable end of the connecting terminal is forced to contact and conduct with the first fixed terminal and the second fixed terminal through a second end of the lever component.

2. The safety socket of claim 1, wherein the plughole component comprises a metal base plate, the three static contact pieces are arranged on three sides of the base plate, and the movable contact piece is pivotally connected and electrically conducted with the base plate through the conductive portion.

3. The safety socket of claim 2, wherein only the static contact piece located opposite to the movable contact piece is a conductive contact piece, and the movable contact piece and the opposite static contact piece are located at both ends of the plughole in a length direction.

4. The safety socket of claim 1, wherein the elastic component comprises a rotating shaft vertically arranged and rotatably mounted in the housing, a connecting plate connecting the rotating shaft and the movable contact piece, and a torsion spring sleeved on the rotating shaft and used to provide elastic force for the movable contact piece.

5. The safety socket of claim 4, wherein a bottom end of the pressing rod passes downwardly through the first end of the lever component, the spring is sleeved on the pressing rod, and both ends of the spring abut between a bottom surface of the lever component and an inner bottom surface of the housing.

6. The safety socket of claim 1, wherein the lever component comprises a rotating shaft arranged laterally and rotatably mounted on the housing as a fulcrum, and a lever whose middle portion is fixed to the rotating shaft and rotates with the rotating shaft.

7. The safety socket of claim 6, wherein the lever is made of insulating material.

8. The safety socket of claim 1, wherein the connecting terminal comprises a vertical portion and a horizontal portion that are integrally punched and formed, and one end of the vertical portion correspondingly disposed on an outer side of the conductive portion forms the static end, one end of the horizontal portion correspondingly disposed below the first fixed terminal and the second fixed terminal forms the movable end, and the movable end is fixed with the second end of the lever component.

9. The safety socket of claim 1, wherein protruding contacts for contact and conduction are provided between the conductive portion and the static end, and between the movable end and the first fixed terminal and the second fixed terminal.

* * * * *